United States Patent
Roy et al.

(10) Patent No.: US 12,381,619 B2
(45) Date of Patent: Aug. 5, 2025

(54) EFFICIENT TRACKING AREA UPDATE IN LEO-NTN

(71) Applicant: MediaTek Singapore Pte. Ltd., Singapore (SG)

(72) Inventors: Abhishek Roy, San Jose, CA (US); Chia-Chun Hsu, Hsinchu (TW); Pradeep Jose, Cambridge (GB); Mehmet Kunt, Cambridge (GB)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 480 days.

(21) Appl. No.: 17/996,443

(22) PCT Filed: Apr. 21, 2021

(86) PCT No.: PCT/CN2021/088720
§ 371 (c)(1),
(2) Date: Oct. 18, 2022

(87) PCT Pub. No.: WO2021/213442
PCT Pub. Date: Oct. 28, 2021

(65) Prior Publication Data
US 2023/0208505 A1    Jun. 29, 2023

Related U.S. Application Data

(60) Provisional application No. 63/012,945, filed on Apr. 21, 2020.

(51) Int. Cl.
H04B 7/185    (2006.01)
(52) U.S. Cl.
CPC ..... *H04B 7/18504* (2013.01); *H04B 7/18513* (2013.01)

(58) Field of Classification Search
CPC ........... H04B 7/18504; H04B 7/18513; H04W 60/04; H04W 48/20; H04W 84/06
See application file for complete search history.

(56) References Cited

U.S. PATENT DOCUMENTS 9,860,817 B2    1/2018  Wang
10,849,099 B2   11/2020 Jiang
(Continued)

FOREIGN PATENT DOCUMENTS

| CN | 103281775 A | 9/2013 |
| WO | 2013/048100 A1 | 4/2013 |
| WO | 2019075659 A1 | 4/2019 |

OTHER PUBLICATIONS

Bagaa, Miloud, Tarik Taleb, and Adlen Ksentini. "Efficient tracking area management framework for 5G networks." IEEE Transactions on Wireless Communications 15.6 (2016): 4117-4131. (Year: 2016).*
(Continued)

*Primary Examiner* — Sharad Rampuria
(74) *Attorney, Agent, or Firm* — McClure, Qualey & Rodack, LLP

(57) ABSTRACT

Low Earth Orbit (LEO) satellites orbit around the earth at a high speed (mobility), but over a predictable or deterministic orbit. In this invention, an efficient mechanism to include a list of multiple Tracking Area Codes (TAC List) in LEO-NTN is proposed for efficient tracking area update (TAU). Each cell broadcasts a TAC list corresponding to all the tracking areas it covers as it moves, dynamically. A UE selects a cell and is registered with a TA during initial registration and cell selection. As the satellite moves, the UE reselects another cell during cell reselection. The UE triggers a TAU only if its current TA does not match with any tracking area code of the TAC List broadcasted by the
(Continued)

reselected cell. By using the concept of TAC list, it significantly reduces the TAU signaling overhead in LEO-NTN.

18 Claims, 4 Drawing Sheets

(56) References Cited

U.S. PATENT DOCUMENTS

| | | | |
|---|---|---|---|
| 2019/0350015 A1 | 11/2019 | Kim et al. | |
| 2020/0068355 A1 | 2/2020 | Edge | |
| 2022/0052753 A1* | 2/2022 | Speidel | H04B 7/18513 |
| 2022/0182914 A1* | 6/2022 | Määttänen | H04W 36/00835 |
| 2024/0031972 A1* | 1/2024 | Kuang | H04W 60/04 |

OTHER PUBLICATIONS

Extended European Search Report dated Nov. 28, 2023, issued in application No. EP 21793691.3.
"3rd Generation Partnership Project-Technical Specification Group Radio Access Network; Solutions for NR to support non-terrestrial networks (NTN) (Release 16);" 3GPP TR 38.821; Jan. 2020; pp. 1-140.
ZTE Corporation, et al.; "Further consideration on tracking area management in NTN;" 3GPP TSG-RAN WG2; Oct. 2019; pp. 1-7.
Chinese language office action dated Sep. 6, 2024, issued in application No. CN 202180030000.4.
International Search Report and Written Opinion dated Jul. 21, 2021, issued in application No. PCT/CN2021/088720.
ZTE et al.; "Tracking Area Management and Paging Handling in NTN;" 3GPP TSG RAN WG3#103 R3-190139; Mar. 2019; pp. 1-15.

* cited by examiner

EFFICIENT TRACKING AREA UPDATE IN LEO-NTN

CROSS REFERENCE TO RELATED APPLICATIONS

This application claims priority under 35 U.S.C. § 119 from U.S. Provisional Application No. 63/012,945, entitled "Efficient Tracking Area Update in LEO-NTN," filed on Apr. 21, 2020, the subject matter of which is incorporated herein by reference.

TECHNICAL FIELD

The disclosed embodiments relate generally to wireless network communications, and, more particularly, to tracking area update in New-Radio NR-based, LEO Non-Terrestrial Networks (NTNs).

BACKGROUND

There is increasing interest and participation in 3GPP from the satellite communication industry, with companies and organizations convinced of the market potential for an integrated satellite and terrestrial network infrastructure in the context of 3GPP 5G. Satellites refer to Spaceborne vehicles in Low Earth Orbits (LEO), Medium Earth Orbits (MEO), Geostationary Earth Orbit (GEO) or in Highly Elliptical Orbits (HEO). 5G standards make Non-Terrestrial Networks (NTN)—including satellite segments—a recognized part of 3GPP 5G connectivity infrastructure. A Low Earth Orbit is an Earth-centered orbit with an altitude of 2,000 km or less, or with at least 11.25 periods per day and an eccentricity less than 0.25. Most of the manmade objects in outer space are in LEO. Low Earth Orbit (LEO) satellites orbit around the earth at a high speed (mobility), but over a predictable or deterministic orbit.

In 4G Long-Term Evolution (LTE) and 5G new radio (NR) networks, an evolved universal terrestrial radio access network (E-UTRAN) includes a plurality of base stations, e.g., evolved Node-Bs (eNodeBs) communicating with a plurality of mobile stations referred as user equipment (UEs). In NR, the base stations are referred to as gNodeBs or gNBs. For UEs in radio resource control (RRC) Idle mode mobility, cell selection is the procedure through which a UE picks up a specific cell for initial registration after power on. On the other hand, cell reselection is the mechanism to change cell after UE is camped on a cell and stays in idle mode. Cell reselection is a continuous process through which UE searches and camps on a better cell than its current cell.

Naturally, high speed of LEO satellites will incur frequent cell reselection. On cell reselection, if the tracking area (TA) code (TAC) and the PLMN broadcast by a serving cell does not match any of the TA identities (TAIs) in the TAI list, a UE triggers a TA update (TAU). If network indicates a System Information change to the UE (via Paging/Direct Indication information), the UE re-acquires the broadcasted system information. All UEs covered by the cell, which previously broadcast a different TAC, will detect a TAC change and initiate TAU. This will cause massive TAU signalling between the UEs and the network. In LEO-NTN, as the satellite is moving, the cells quickly sweep over the earth's surface. For earth-fixed tracking area, this triggers frequent TAUs, thereby increasing the signalling load.

A solution is sought.

SUMMARY

Low Earth Orbit (LEO) satellites orbit around the earth at a high speed (mobility), but over a predictable or deterministic orbit. In this invention, an efficient mechanism to include a list of multiple Tracking Area Codes (TAC List) in LEO-NTN is proposed for efficient tracking area update (TAU). Each cell broadcasts a TAC list corresponding to all the tracking areas it covers as it moves, dynamically. A UE selects a cell and is registered with a TA during initial registration and cell selection. As the satellite moves, the UE reselects another cell during cell reselection. The UE triggers a TAU only if its current TA does not match with any tracking area code of the TAC List broadcasted by the reselected cell. By using the concept of TAC list, it significantly reduces the TAU signaling overhead in LEO-NTN.

In one embodiment, a UE performs cell selection in a new radio (NR) based Low Earth Orbit (LEO) Non-Terrestrial Network (NTN). The UE selects a first cell associated with a first tracking area code (TAC) list. The UE performs a registration procedure with a serving base station. The UE is registered with a first TAC from the first TAC list. The UE performs cell reselection and selecting a second cell. The second cell is associated with a second TAC list. The UE determines whether the first TAC is included in the second TAC list. The UE initiates a TA update (TAU) procedure when the first TAC is not included in the second TAC list.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
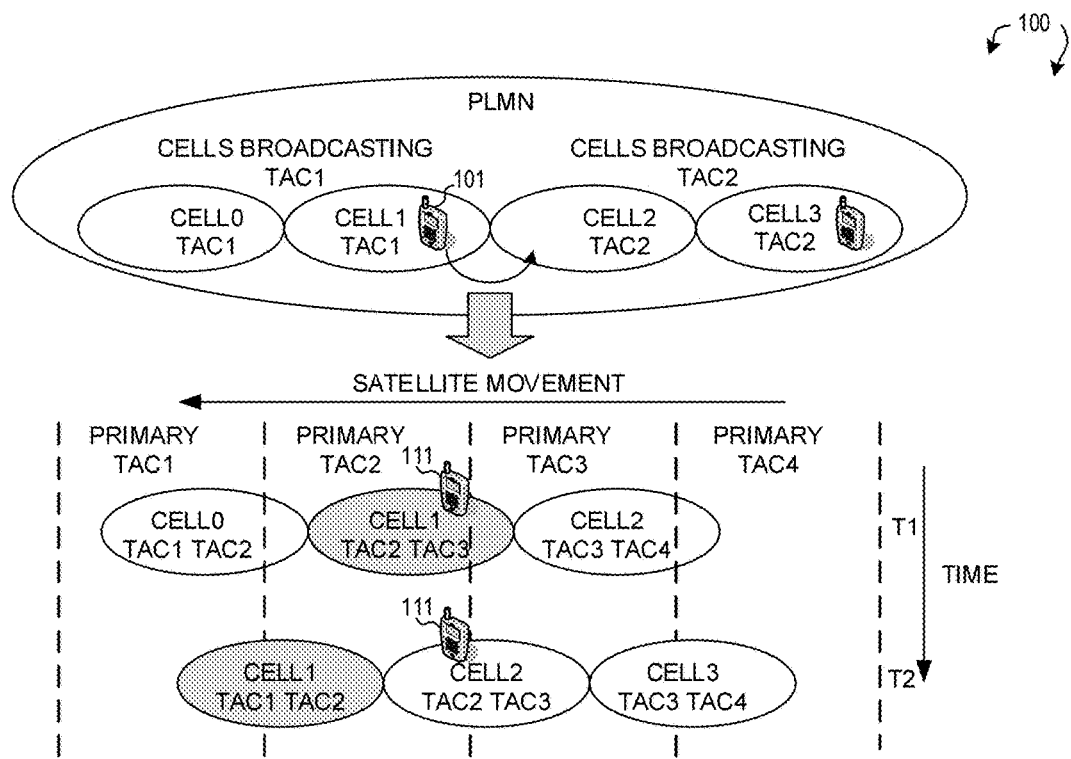
FIG. 1 illustrates an exemplary 5G new radio (NR) wireless communication system that supports improved tracking area update (TAU) procedure in Low Earth Orbit (LEO) Non-Terrestrial Network (NTN) in accordance with a novel aspect.

FIG. 1 illustrates an exemplary 5G new radio (NR) wireless communication system 100 that supports improved tracking area update (TAU) procedure in Low Earth Orbit (LEO) Non-Terrestrial Network (NTN) in accordance with a novel aspect. In NR wireless communication system 100, an operator of a Pubic Land Mobile Network (PLMN) divides its network (NW) into tracking areas (TAs), composed of a set of cells. The cells are served by a plurality of base stations, e.g., evolved Node-Bs (eNodeBs in LTE or gNodeBs in NR) communicating with a plurality of mobile stations referred as user equipment (UEs). UEs located within a TA region are registered with that TA. On initial registration, the NW provides the UE with a list of TA identities (TAIs) it belongs to using the downlink Attach Accept/TAU Accept message. TAIs include both TA code (TAC) and PLMN. Each cell broadcast (e.g., via SIB1) TAC and PLMN to UEs in the network. On cell reselection, if the TAC and the PLMN broadcasted by the selected cell does not match any of the TAIs in the TAI list, then the UE triggers a TA update (TAU). If network indicates a System Information change to the UE (e.g., via Paging or Direct Indication information), then the UE re-acquires the broadcasted system information.

During activity, NW pages UE only within the TA it is registered on. For example, paging is received by a UE on Paging Occasions (POs), where the specific resources are periodically reserved for paging. This period is known as Paging Cycle. A paging message can address multiple UEs. Paging occasions for different UEs can also be scattered out in time domain. However, there is an upper limit to the number of UEs that a network can page within a TA. This is why a network is separated out into multiple TAs. LEO satellites orbiting around the earth at a high speed (mobility), but over a predictable or deterministic orbit. As a result, mobility in LEO satellite-based NTN can be quite different from terrestrial networks. In terrestrial networks, cells are fixed but UEs may move in different trajectories. On the other hand, in NTN, most of the LEO satellites travel at a very high speed relative to the earth's ground. The satellite's speed is too high to compare with the speed of any mobile UE, including airplane users. For example. In LEO scenario with 600 km height, a speed of 7.56 km/sec and a beam spot diameter of around 70 km, there will be frequent cell reselection at less than every 10 seconds.

Naturally, the high speed of LEO satellites will result in frequent cell reselection. In LEO-NTN, as the satellite is moving, the cells quickly sweep over the earth's surface. For earth-fixed tracking area, this triggers frequent TAUs, thereby increasing the signalling load. In the example of FIG. 1, one cell broadcasts one TAC, e.g., cell0 and cell1 broadcast TAC1, while cell2 and cell3 broadcast TAC2. As the satellite is moving, UEs (e.g., UE 101) in cell1 is originally registered with TAC1, it later reselects cell2 from cell1, and detects a change in TA from TAC1 to TAC2, which triggers the UE to initiate a Registration Update with TAU. On cell reselection, all UEs covered by the cell, which previously broadcast a different TAC, will detect a TAC change and initiate TAU. This will cause massive TAU signalling between the UEs and the network.

Accordingly, an efficient mechanism to include a list of multiple Tracking Area Codes (TAC List) in LEO-NTN is proposed to facilitate improved TAU. A cell broadcasts a TAC list corresponding to all the tracking areas it covers as it moves, dynamically. The key idea here is that each cell broadcasts a set of TACs, corresponding to the region covered by the specific NR or NB-IoT based LEO-NTN cell (beam spot), as the cells sweep over (cross) the region. As depicted by the bottom diagram of FIG. 1, at time T1, cell0 broadcasts TAC1 and TCA2, cell1 broadcasts TAC2 and TCA3, and cell2 broadcasts TAC3 and TCA4. UE 111 selects cell1 and registered with TAC2 in initial registration and cell selection. At time T2, cell1 broadcasts TAC1 and TCA2, cell2 broadcasts TAC2 and TCA3, and cell3 broadcasts TAC3 and TCA4. When UE 111 reselects cell2 from cell1, TAC2 is included in TAC list broadcasted by cell2. Then network can still page the UEs including UE 111 on cells broadcasting TAC2 (i.e., cell1 and cell2), therefore no TAU is triggered. By using the TAC list, UE triggers a TAU only if its registered TA does not match with any tracking area code of the TAC List broadcasted by the reselected cell. As a result, this significantly reduces the TAU signaling overhead.

Figure 2:
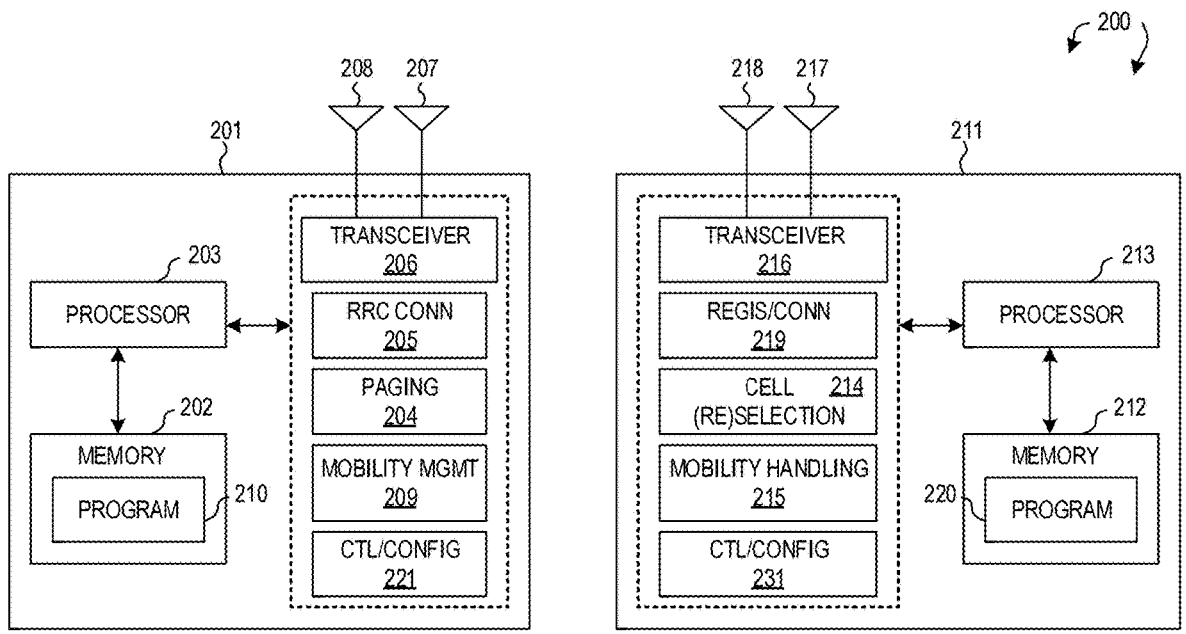
FIG. 2 is a simplified block diagram of a wireless transmitting device and a receiving device in accordance with embodiments of the present invention.

FIG. 2 is a simplified block diagram of wireless devices 201 and 211 in accordance with embodiments of the present invention. For wireless device 201 (e.g., a base station), antenna 207 and 208 transmit and receive radio signal. RF transceiver module 206, coupled with the antenna, receives RF signals from the antenna, converts them to baseband signals and sends them to processor 203. RF transceiver 206 also converts received baseband signals from the processor, converts them to RF signals, and sends out to antenna 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a user equipment), antenna 217 and 218 transmit and receive RF signals. RF transceiver module 216, coupled with the antenna, receives RF signals from the antenna, converts them to baseband signals and sends them to processor 213. The RF transceiver 216 also converts received baseband signals from the processor, converts them to RF signals, and sends out to antenna 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a base station or a network entity that includes an RRC connection handling module 205, a paging module 204, a mobility management module 209, and a control and configuration circuit 221. Wireless device 211 is a UE that includes a registration/connection module 219, a cell selection and reselection module 214, a mobility handling module 215, and a control and configuration circuit 231. Note that a wireless device may be both a transmitting device and a receiving device. The different functional modules and circuits can be implemented and configured by software, firmware, hardware, and any combination thereof. The function modules and circuits, when executed by the processors 203 and 213 (e.g., via executing program codes 210 and 220), allow base station 201 and UE 211 to perform embodiments of the present invention.

In one example, the base station 201 establishes an RRC connection with the UE 211 via RRC connection handling circuit 205, pages UEs in specific TAs via paging module 204, performs mobility and handover management via mobility management module 209, and provides broadcast and other configuration information to UEs via control and configuration circuit 221. The UE 211 performs registration and handles RRC connection via registration/connection handling circuit 219, performs cell selection and reselection via cell (re)selection module 214, performs mobility and handover via mobility handling module 215, and obtains broadcast and other configuration information via control and configuration circuit 231. In one novel aspect, base station 201 provides TAC information to UE 211 by broadcasting a TAC list in the serving cell via System Information Block 1 (SIB1). The list corresponding to all the tracking areas the serving cell covers as the cell moves, dynamically. In cell reselection, UE triggers a TAU only if its registered TA does not match with any tracking area code of the TAC List broadcasted by the reselected cell. As a result, this significantly reduces the TAU signaling overhead.

Figure 3:
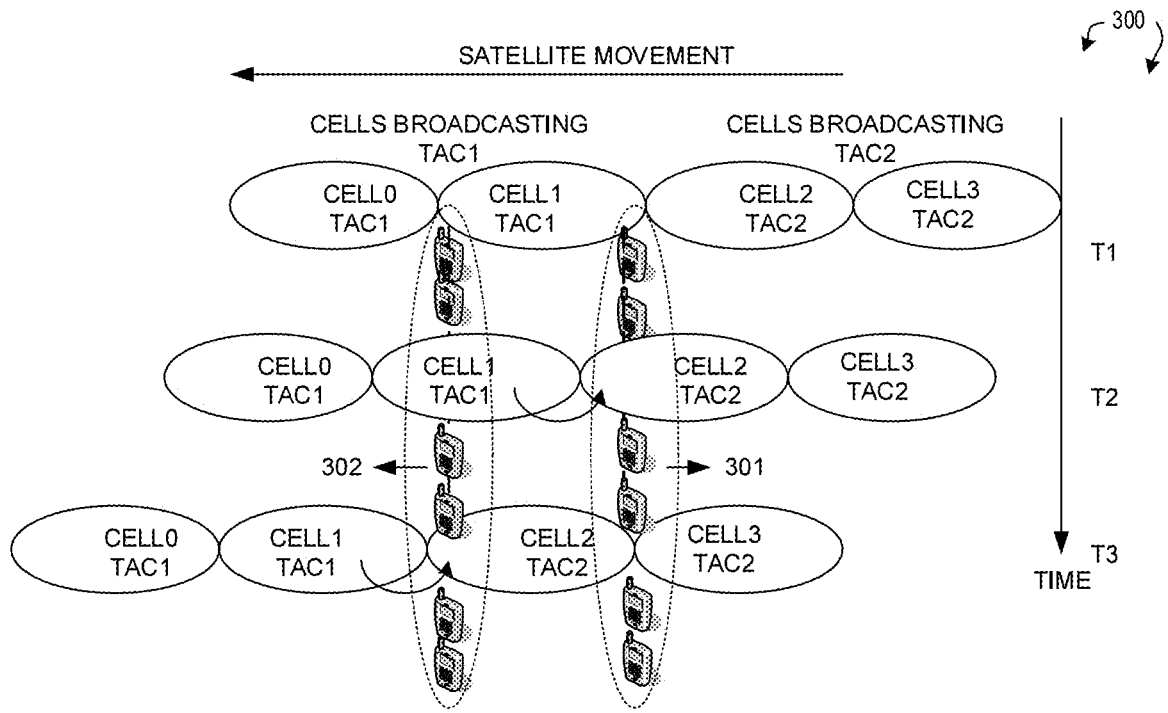
FIG. 3 illustrates mobility in LEO satellite based NTN and corresponding TAU procedure when one cell broadcast one TAC as in TN.

FIG. 3 illustrates mobility in LEO satellite based NTN and corresponding TAU procedure when one cell broadcast one TAC as in TN. In order to reduce the TAU signalling load, earth fixed tracking areas are typically used in NR NTN. Hence, the cells or gNBs update the TAC that they broadcast based on their coverage on ground. As in TN, each tracking area covers a set of cells and one cell broadcasts only one TAC that it belongs to. When a cell starts covering a region with a different TAC, it starts broadcasting the TAC for that region. The TAC is only checked by the UE at cell selection/reselection. Therefore, if the TAC broadcast by the cell changes after a UE has reselected to a cell, the Access Stratum (AS) would not detect the TAC change and TAU procedure would be signalling. However, if the network indicates a System Information (SI) change to the UE (via Paging/Direct Indication information), the UE re-acquires the broadcasted system information. All UEs covered by the cell, which previously broadcast a different TAC, will detect a TAC change and initiate a TAU procedure. This will cause massive TAU signalling between the UEs and the network, especially in LEO-NTN.

In the Example of FIG. 3, the following happens with all the UEs. At time T1, all UEs select cell1 and are registered with TAC1, which covers cell0 and cell1. At time T2, the right-side UEs (301) reselect Cell2 from Cell1 due to satellite movement. These UEs 301 detect a change in TA from TAC1 to TAC2 and initiate a Registration Update with TAU. Similarly, at time T3, the left-side UEs (302) reselect Cell2 from Cell1 due to satellite movement. These UEs 302 detect a change in TA from TAC1 to TAC2 and initiate a Registration Update with TAU. It can be seen that due to frequency cell reselection, frequency TAU procedures are triggered in LEO-TNT, causing massive TAU signaling overhead.

Figure 4:
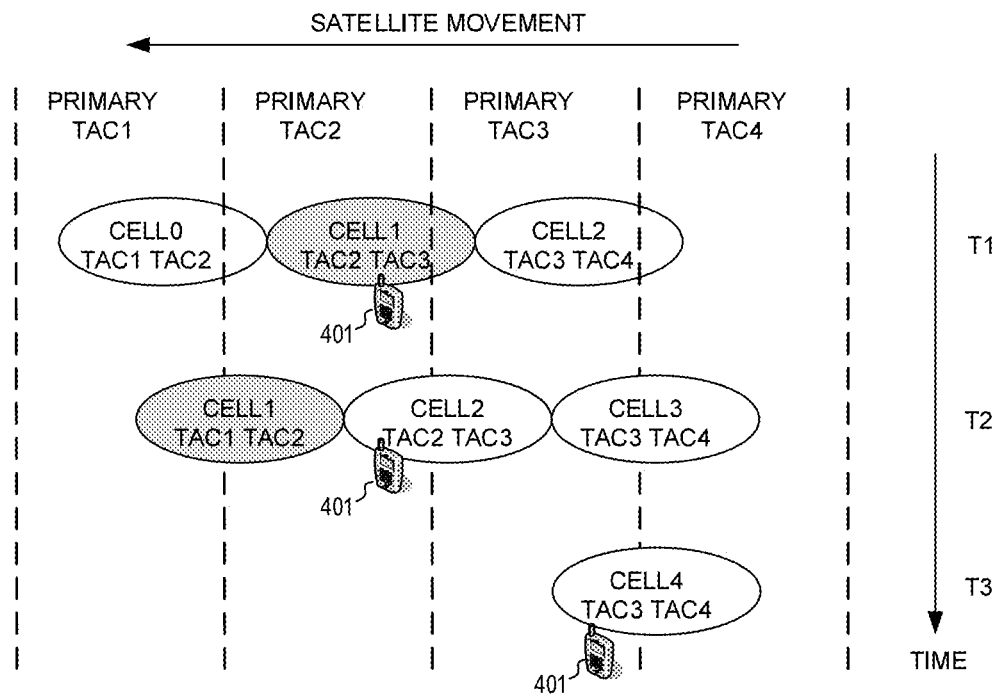
FIG. 4 illustrates mobility in LEO satellite based NTN and corresponding TAU procedure in accordance with one novel aspect.

FIG. 4 illustrates mobility in LEO satellite based NTN and corresponding TAU procedure in accordance with one novel aspect. In the example of FIG. 3 illustrated earlier, in TN, each tracking area covers a set of cells and one cell broadcasts only one TAC that it belongs to. In order to reduce massive TAU signaling due to satellite movement in LEO NTN, a cell broadcasts a TAC list corresponding to the region it covers as it moves, dynamically. This solution avoids the problem with system information change where single TAC is broadcasted. The key idea is that the cells dynamically broadcast a set of TACs corresponding to all the TAs covered by the cells. For example, as illustrated in FIG. 4, at time T1, cell0 covers both TAC1 and TAC2, and thus cell0 broadcasts TAC1 and TAC2. Similarly, cell1 covers both TAC2 and TAC3, and thus cell1 broadcasts TAC2 and TAC3; cell2 covers both TAC3 and TAC4, and thus cell2 broadcasts TAC3 and TAC4. At time T2, cell1 covers both TAC1 and TAC2, and thus cell1 broadcasts TAC1 and TAC2; cell2 covers both TAC2 and TAC3, and thus cell2 broadcasts TAC2 and TAC3; cell3 covers both TAC3 and TAC4, and thus cell3 broadcasts TAC3 and TAC4. At time T3, cell4 covers both TAC3 and TAC4, and thus cell4 broadcasts TAC3 and TAC4.

In the example of FIG. 4, at time T1, the network broadcasts both TAC2 and TAC3, e.g., from the base station serving cell1. The network can decide and send the Registration Accept message and no TAU is needed. The network selects TAC2, so the TAI list includes TAC2+PLMN. As a result, UE 401 selects cell1 and is registered with TAC2 initially. The network can page UE 401 on cells broadcasting TAC2 (i.e., cell0 and cell1). At time T2, when UE 401 reselects to cell2, the current registered TAC2 is included in the TAC list, because the network broadcasts both TAC2 and TAC3 from cell2 at time T2. The network can page UE 401 on cells broadcasting TAC2 (i.e. cell1 and cell2), and no TAU is initiated. At time T3, when UE 401 reselects to cell4, UE 401 issues a Registration Update. The network broadcast a TAC list from cell4, which contains TAC3 and TAC4, and none of them UE 401 is currently registered with. Hence UE 401 initiates a TAU and is registered with TAC3, selected by the network. The network can now page UE 401 on cells currently broadcasting TAC3. Based on these explanations, the steps of initial registration and cell re-selection (both with and without TAU) can be determined.

Figure 5:
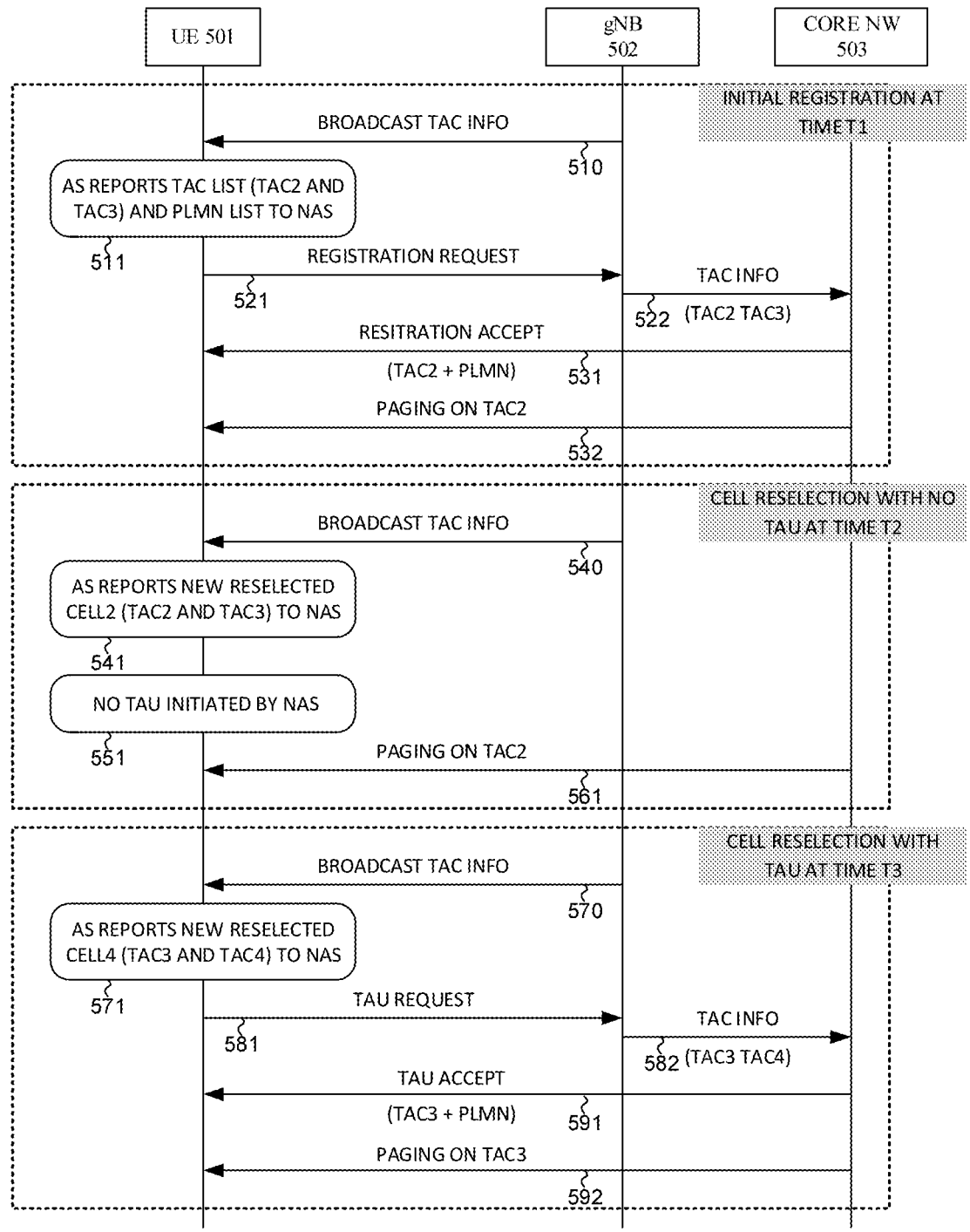
FIG. 5 illustrates a sequence flow between a UE and the network for improved TAU procedure in accordance with one novel aspect.

FIG. 5 illustrates a sequence flow between a UE and the network for improved TAU procedure including initial registration and cell re-selection in accordance with one novel aspect. In step 510, UE 501 receives broadcasted TAC information from the network. In step 511, UE 501 selects cell1, which broadcasts TAC2 and TAC3. The AS layer of the UE reports the TAC list of the selected cell (cell1) and the PLMN list to the NAS layer of the UE. In step 521, the NAS layer of the UE sends a Registration Request (Attach Request) message to a serving base station gNB 502. In step 522, gNB 502 forwards the message to the core network 503, along with the tracking area info (TAC2 and TAC3). In step 531, network sends a Registration Accept (Attach Accept) message back to UE 501, which includes TAI list (TAC+PLMN) that the UE is registered for. In this example, the network selects TAC2 for UE 501, so the TAI list includes TAC2. UE 501 is thus registered with TAC2. In step 532, network pages UEs (including UE 501) on cells broadcasting TAC2.

In step 540, UE 501 continue to receive broadcasted TAC information from the network. In step 541, UE 501 performs measurements and cell reselection as the satellite is moving. UE reselects cell2, which broadcasts TAC2 and TAC3. The AS layer of the UE reports the TAC list of the newly re-selected cell (cell2) to the NAS layer of the UE (i.e., TAC2 and TAC3). The TAC that the UE was registered previously (TAC2) is already included in the TAC list (TAC2+TAC3) broadcasted from cell2. In step 551, the NAS layer determines that Tracking Area Update (TAU) needs not be initiated. Accordingly, UE 501 is still registered with TAC2. In step 561, network pages UEs (including UE 501) on cells broadcasting TAC2.

In step 570, UE 501 continue to receive broadcasted TAC information from the network. In step 571, UE 501 performs measurements and cell reselection as the satellite is moving. UE reselects cell4, which broadcasts TAC3 and TAC4. The AS layer of the UE reports the TAC list of the newly re-selected cell (cell4) to the NAS layer of the UE (i.e., TAC3 and TAC4). The TAC that the UE was registered previously (TAC2) is not included in TAC list (TAC3+TAC4) broadcasted from cell4. In step 581, the NAS layer initiates a Tracking Area Update (TAU), sends a TAU Request message to the network. In step 582, When gNB 502 forwards the message to the core network 503, it adds tracking area info (TAC3, TAC4). In step 591, the network sends a TAU Accept message to the UE, including the TAI list (TAC+PLMN) that the UE is registered for. In this example, the network selects TAC3 for UE 501, so the TAI list includes TAC3. UE 501 is thus registered with TAC3. In step 592, network pages UEs (including UE 501) on cells broadcasting TAC3 (including cell4).

Figure 6:
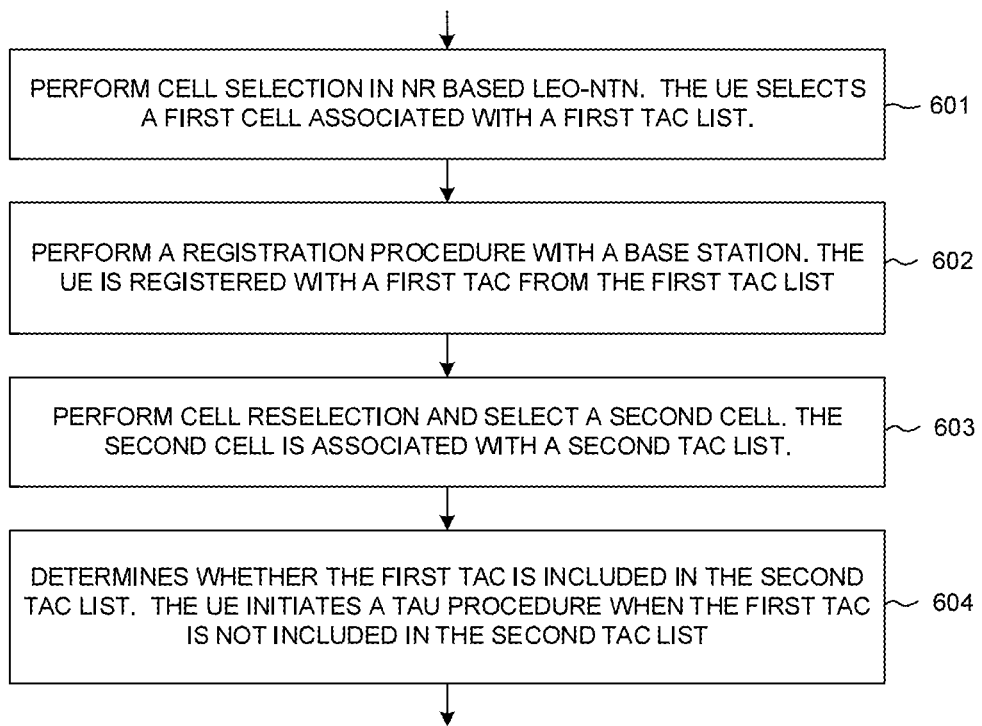
FIG. 6 is a flow chart of a method for improving tracking update (TAU) procedure and reducing TAU signaling overhead from UE perspective in LEO-NTN in accordance with one novel aspect.

FIG. 6 is a flow chart of a method for improving tracking update (TAU) procedure and reduce TAU signaling overhead from UE perspective in LEO-NTN in accordance with one novel aspect. In step 601, a UE performs cell selection in a new radio (NR) based Low Earth Orbit (LEO) Non-Terrestrial Network (NTN). The UE selects a first cell associated with a first tracking area code (TAC) list. In step 602, the UE performs a registration procedure with a serving base station. The UE is registered with a first TAC from the first TAC list. In step 603, the UE performs cell reselection and selects a second cell. The second cell is associated with a second TAC list. In step 604, the UE determines whether the first TAC is included in the second TAC list. The UE initiates a TA update (TAU) procedure when the first TAC is not included in the second TAC list. In one example, the UE receives TAC information broadcasted from the network, which comprises a TAC list corresponding to all tracking areas covered by a corresponding cell.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

The invention claimed is:

1. A method comprising:
performing cell selection by a user equipment (UE) in a new radio (NR) based Low Earth Orbit (LEO) Non-Terrestrial Network (NTN),
wherein the UE selects a first cell associated with a first tracking area code (TAC) list;
performing a registration procedure with a first TAC from the first TAC list;
performing cell reselection and selecting a second cell, wherein the second cell is associated with a second TAC list; and
determining whether the first TAC is included in the second TAC list,
wherein the UE initiates a TA update (TAU) procedure when the first TAC is not included in the second TAC list,
wherein the TAU procedure involves the UE sending a TAU Request message that comprises the second TAC list, and
wherein the UE receives a TAU Accept message and the UE is registered to a second TAC from the second TAC list.

2. The method of claim 1, wherein the first TAC list lists a plurality of tracking areas covered by the first cell, and wherein the second TAC list lists a plurality of tracking areas covered by the second cell.

3. The method of claim 2, wherein the first TAC list and the second TAC list are dynamically updated when the tracking areas covered by the first cell and the second cell are changed.

4. The method of claim 1, wherein a Registration Request message in the registration procedure comprises the first TAC list, and wherein a Registration Accept message in the registration procedure comprises the first TAC from the network.

5. The method of claim 1, wherein the UE is registered with the first TAC after selecting the second cell when the first TAC is included in the second TAC list.

6. The method of claim 1, wherein the UE does not initiate the TAU procedure when the first TAC is included in the second TAC list.

7. The method of claim 1, wherein a Registration Request message in the registration procedure is send from a Non-Access-Stratum (NAS) layer of the UE responsive to the first TAC list reported from an Access-Stratum (AS) layer of the UE.

8. The method of claim 1, wherein an Access-Stratum (AS) layer of the UE reports the second TAC list to a Non-Access-Stratum (NAS) layer of the UE, and wherein the NAS layer determines whether to perform the TAU procedure.

9. The method of claim 8, wherein the NAS layer initiates the TAU procedure upon cell reselection when the first TAC is not included in the second TAC list.

10. A User Equipment (UE), comprising:
a cell selection circuitry configured to perform cell selection in a new radio (NR) based Low Earth Orbit (LEO) Non-Terrestrial Network (NTN),
wherein the UE selects a first cell associated with a first tracking area code (TAC) list;
a registration circuitry configured to perform a registration procedure with a first TAC from the first TAC list;
a cell reselection circuitry configured to perform cell reselection and select a second cell, wherein the second cell is associated with a second TAC list; and
a control circuitry configured to determine whether the first TAC is included in the second TAC list,
wherein the UE initiates a TA update (TAU) procedure when the first TAC is not included in the second TAC list,
wherein the TAU procedure involves the UE sending a TAU Request message that comprises the second TAC list, and
wherein the UE receives a TAU Accept message and the UE is registered to a second TAC from the second TAC list.

11. The UE of claim 10, wherein the first TAC list lists a plurality of tracking areas covered by the first cell, and wherein the second TAC list lists a plurality of tracking areas covered by the second cell.

12. The UE of claim 11, wherein the first TAC list and the second TAC list are dynamically updated when the tracking areas covered by the first cell and the second cell are changed.

13. The UE of claim 10, wherein a Registration Request message in the registration procedure comprises the first TAC list, and wherein a Registration Accept message in the registration procedure comprises the first TAC from the network.

14. The UE of claim 10, wherein the UE is registered with the first TAC after selecting the second cell when the first TAC is included in the second TAC list.

15. The UE of claim 10, wherein the UE does not initiate the TAU procedure when the first TAC is included in the second TAC list.

16. The UE of claim 10, wherein a Registration Request message in the registration procedure is send from a Non- Access-Stratum (NAS) layer of the UE responsive to the first TAC list reported from an Access-Stratum (AS) layer of the UE.

17. The UE of claim 10, wherein an Access-Stratum (AS) layer of the UE reports the second TAC list to a Non-Access-Stratum (NAS) layer of the UE, and wherein the NAS layer determines whether to perform the TAU procedure.

18. The UE of claim 17, wherein the NAS layer initiates the TAU procedure upon cell reselection when the first TAC is not included in the second TAC list.

* * * * *